United States Patent
Fu et al.

(10) Patent No.: US 12,358,514 B2
(45) Date of Patent: Jul. 15, 2025

(54) VEHICLE POSE ASSESSMENT

(71) Applicant: Zenseact AB, Gothenburg (SE)

(72) Inventors: Junsheng Fu, Nödinge (SE); Axel Beauvisage, Gothenburg (SE); Blazej Slusarek, Hisings Backa (SE); Eduardo Sesma Caselles, Västra Frölunda (SE); Pontus Kielén, Mölndal (SE); Markus Hammarsten, Gothenburg (SE); Tony Gustafsson, Askim (SE); Eiliv Hägg, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 302 days.

(21) Appl. No.: 18/193,258

(22) Filed: Mar. 30, 2023

(65) Prior Publication Data
US 2023/0322236 A1    Oct. 12, 2023

(30) Foreign Application Priority Data
Apr. 6, 2022    (EP) .................................... 22166949

(51) Int. Cl.
*G01C 21/30*    (2006.01)
*B60W 40/06*    (2012.01)
*B60W 40/10*    (2012.01)
*G06V 20/56*    (2022.01)

(52) U.S. Cl.
CPC ............ *B60W 40/10* (2013.01); *B60W 40/06* (2013.01); *G06V 20/588* (2022.01); *B60W 2420/403* (2013.01); *B60W 2520/06* (2013.01)

(58) Field of Classification Search
CPC .... G01C 21/30; G01C 21/32; G01C 21/3867; B60W 2556/40; B60W 2420/403; B60W 60/001; G06V 20/588
See application file for complete search history.

(56) References Cited

U.S. PATENT DOCUMENTS

| | | | |
|---|---|---|---|
| 2016/0377440 A1* | 12/2016 | Dorum ............... | G01C 21/3492 702/150 |
| 2017/0016730 A1* | 1/2017 | Gawrilow ............. | G01C 21/30 |
| 2017/0169300 A1* | 6/2017 | Heisele .................... | G06T 7/74 |
| 2020/0218906 A1 | 7/2020 | Wang et al. | |
| 2020/0250439 A1* | 8/2020 | Vig ....................... | G05D 1/0246 |

FOREIGN PATENT DOCUMENTS

| | | |
|---|---|---|
| EP | 4020111 A1 | 6/2022 |
| WO | 2020232648 A1 | 11/2020 |

OTHER PUBLICATIONS

EPO Communication with Extended European Search Report dated Oct. 21, 2022 for European Patent Application No. 22166949.2 filed Apr. 6, 2022, consisting of 25-pages.

* cited by examiner

*Primary Examiner* — Kenneth J Malkowski
(74) *Attorney, Agent, or Firm* — Weisberg I.P. Law, P.A.

(57) ABSTRACT

A method performed by a vehicle pose assessment system for supporting determining a pose of a vehicle in view of a digital map. The approach provided by the method alleviates finding lane segments of the digital map corresponding to current sensor detections, which in turn may support accurate and/or improved vehicle localization. An apparatus and computer storage medium for supporting determining a pose of a vehicle in view of a digital map are also provided.

20 Claims, 4 Drawing Sheets

1 Vehicle pose assessment system

VEHICLE POSE ASSESSMENT

TECHNICAL FIELD

The present disclosure relates to supporting determining a pose of a vehicle—such as an ADS-equipped vehicle—in view of a digital map

BACKGROUND

Within the automotive field, there has for quite some years been activity in the development of autonomous vehicles. An increasing number of modern vehicles have advanced driver-assistance systems, ADAS, to increase vehicle safety and more generally road safety. ADAS—which for instance may be represented by adaptive cruise control, ACC, collision avoidance system, forward collision warning, etc.—are electronic systems that may aid a vehicle driver while driving. Moreover, in a not-too-distant future, Autonomous Driving, AD, will to a greater extent find its way into modern vehicles. AD along with ADAS will herein be referred to under the common term Automated Driving System, ADS, corresponding to all different levels of automation, for instance as defined by the SAE J3016 levels (0-5) of driving automation. An ADS may be construed as a complex combination of various components that can be defined as systems where perception, decision making, and operation of the vehicle—at least in part—are performed by electronics and machinery instead of a human driver. This may include handling of the vehicle, destination, as well as awareness of surroundings. While the automated system has control over the vehicle, it allows the human operator to leave all or at least some responsibilities to the system. To perceive its surroundings, an ADS commonly combines a variety of sensors, such as e.g. RADAR, LIDAR, sonar, camera, navigation and/or positioning system e.g. GNSS such as GPS, odometer and/or inertial measurement units, upon which advanced control systems may interpret sensory information to identify appropriate navigation paths, as well as obstacles and/or relevant signage.

For an ADS-equipped vehicle, it is important to be able to estimate its pose—i.e. position and orientation—with accuracy and consistency, since this is an important safety aspect when the vehicle is moving in traffic. Conventionally, satellite-based positioning systems such as Global Navigation Satellite Systems (GNSS), for instance Global Positioning System (GPS), Globalnaya Navigazionnaya Sputnikovaya Sistema (GLONASS), Galileo, Beidou etc., have been used for positioning purposes. However, these and other regional systems are often not accurate enough to rely on solely for determining a position of a moving vehicle in autonomous applications. Moreover, GNSS-based solutions have even less accuracy in determining height information. Other solutions involve a combination of GNSS data together with vehicle inertial measurement unit (IMU) signals, which however may suffer from large scale and/or bias errors which subsequently may result in positioning errors e.g. of several meters and/or errors in the orientation estimation. Moreover, the methods and systems described above may work unsatisfactorily in scenarios of poor or no satellite connections, such as in tunnels or close to tall buildings. Alternatively, systems and methods are known in the art which utilize digital map information—e.g. high definition (HD) map information—together with a number of different onboard sensors such as cameras, LIDAR, RADAR and/or other sensors for determining vehicle travelling parameters such as speed and/or angular rate etc., to increase the reliability of the vehicle pose. However, even given current vehicle pose, it may still be challenging to predict a robust vehicle pose estimation by only odometry, e.g. due to measurement noise from different measurement sensors, such as motion sensors. To this end, it is known to employ landmark-based positioning approaches, according to which external sensors—such as onboard surrounding detecting sensors—are used to detect stationary objects—commonly referred to as landmarks—whose geographical positions also are available in the digital map data. The vehicle's pose is then estimated by sequentially comparing the sensor data with where these landmarks are positioned according to the digital map. Examples of landmarks that both typically are available in an digital map and detectable by most automotive grade sensors, are for instance lane markings or markers, traffic signs and traffic lights.

However, there is still a need in the art for new and/or improved solutions supporting and/or enabling accurate and/or improved vehicle localization in autonomous applications.

SUMMARY OF THE INVENTION

It is therefore an object of embodiments herein to provide an approach for in an improved and/or alternative manner support determining a pose of a vehicle—e.g. an ADS-equipped vehicle—in view of a digital map The object above may be achieved by the subject-matter disclosed herein. Embodiments are set forth in the appended claims, in the following description and in the drawings.

The disclosed subject-matter relates to a method performed by a vehicle pose assessment system for supporting determining a pose of a vehicle in view of a digital map. The vehicle pose assessment system predicts a pose of the vehicle based on sensor data acquired by a vehicle localization system. Furthermore, the vehicle pose assessment system transforms to a selected coordinate system a set of map road references of a portion of the digital map based on the predicted pose of the vehicle, wherein the transformed set of map road references form a set of polylines in the selected coordinate system, which set of polylines forms a set of polyline paths respectively comprising segments of polylines. The vehicle pose assessment system further identifies a set of corresponding sensor-captured road reference features acquired by a vehicle-mounted surrounding detecting device, each identified road reference feature defining a set of measurement coordinates in the selected coordinate system. Furthermore, the vehicle pose assessment system projects each of the identified set of road reference features onto the polyline segments in order to obtain a set of projection points, wherein each projection point defines a set of projection coordinates. Moreover, the vehicle pose assessment system determines for each polyline segment, deviation parameters in view of each identified road reference feature, based on a projection distance between respective road reference feature's measurement coordinates and its corresponding polyline segment projection coordinates, wherein for each polyline segment onto which one or more road reference features are having deviations fulfilling deviation criteria, the polyline segment is assigned predeterminable deviation parameters in view of those one or more road reference features. The vehicle pose assessment system further determines by combining the deviation parameters of respective polyline path's polyline segments, a respective path deviation for each polyline path.

The disclosed subject-matter further relates to a vehicle pose assessment system for—and/or adapted and/or configured for—supporting determining a pose of a vehicle in view of a digital map. The vehicle pose assessment system comprises a pose predicting unit for predicting a pose of the vehicle based on sensor data acquired by a vehicle localization system. The vehicle pose assessment system further comprises a map transforming unit for transforming to a selected coordinate system a set of map road references of a portion of the digital map based on the predicted pose of the vehicle, wherein the transformed set of map road references form a set of polylines in the selected coordinate system, which set of polylines forms a set of polyline paths respectively comprising segments of polylines. Moreover, the vehicle pose assessment system comprises a features identifying unit for identifying a set of corresponding sensor-captured road reference features acquired by a vehicle-mounted surrounding detecting device, each identified road reference feature defining a set of measurement coordinates in the selected coordinate system. Furthermore, the vehicle pose assessment system comprises a features projecting unit for projecting each of the identified set of road reference features onto the polyline segments in order to obtain a set of projection points, wherein each projection point defines a set of projection coordinates. Moreover, the vehicle pose assessment system comprises a deviation determining unit for determining for each polyline segment, deviation parameters in view of each identified road reference feature, based on a projection distance between respective road reference feature's measurement coordinates and its corresponding polyline segment projection coordinates, wherein for each polyline segment onto which one or more road reference features are having deviations fulfilling deviation criteria, the polyline segment is assigned predeterminable deviation parameters in view of those one or more road reference features. The vehicle pose assessment system further comprises a path deviation determining unit for determining by combining the deviation parameters of respective polyline path's polyline segments, a respective path deviation for each polyline path.

Furthermore, the disclosed subject-matter relates to a vehicle comprising a vehicle pose assessment system as described herein.

Moreover, the disclosed subject-matter relates to a computer program product comprising a computer program containing computer program code means arranged to cause a computer or a processor to execute the steps of the vehicle pose assessment system described herein, stored on a computer-readable medium or a carrier wave.

The disclosed subject-matter further relates to a nonvolatile computer readable storage medium having stored thereon said computer program product.

Thereby, there is introduced an approach alleviating finding lane segments of a digital map corresponding to current sensor detections, which in turn may support accurate and/or improved vehicle localization. That is, since there is predicted a pose of a vehicle based on sensor data acquired by a vehicle localization system, there is estimated, from assessing obtained sensory information, a position and orientation of the vehicle in a digital map. Furthermore, since there is transformed to a selected coordinate system a set of map road references of a portion of the digital map based on the predicted pose of the vehicle, wherein the transformed set of map road references form a set of polylines in the selected coordinate system, which set of polylines forms a set of polyline paths respectively comprising polyline segments, there is generated in a preferred coordinate system— for instance represented by a 2D image-frame e.g. of an onboard camera or a 3D ego-frame—polylines respectively comprising series of connected consecutive points representing the transformed map road references—such as e.g. lane markers, road edges and/or road barriers—where polyline segments—e.g. corresponding to lane segments of the digital map—form one or more differing polyline paths, such as lane segment paths. Moreover, since there is identified a set of corresponding sensor-captured road reference features acquired by a vehicle-mounted surrounding detecting device, where each identified road reference feature defines a set of measurement coordinates in the selected coordinate system, there is found—e.g. in an image—road reference features corresponding to the set of map road references, obtained with an onboard surrounding detecting device such as e.g. a camera, which sensor-captured road reference features then are mapped to the selected—e.g. image-frame—coordinate system, e.g. the coordinate system of said surrounding detecting device. Furthermore, since each of the identified set of road reference features are projected onto the polyline segments in order to obtain a set of projection points, wherein each projection point defines a set of projection coordinates, the road reference features are mapped to respective polyline segment feasible and/or relevant in view of respective road reference feature. Accordingly, a road reference feature may thus obtain multiple projection points projected onto differing polyline segments respectively. Moreover, that is, since there is determined for each polyline segment, deviation parameters in view of each identified road reference feature, based on a projection distance between respective road reference feature's measurement coordinates and its corresponding polyline segment projection coordinates, wherein for each polyline segment onto which one or more road reference features are having deviations fulfilling deviation criteria, the polyline segment is assigned predeterminable deviation parameters in view of those one or more road reference features, there is quantified to what extent and/or how well each road reference feature algins with respective polyline segment, and further, road reference features e.g. having projection distances greater than a predeterminable threshold—and/or e.g. fulfilling outlier criteria—in view of some polyline segments, render those polyline segments to be attributed with respective predefined parameters—which may be considered and/or referred to as penalty values—pertinent those road reference features. Accordingly, each deviation parameter—for each road reference feature in view of each polyline segment—is either based on, derived from and/or set to its corresponding projection distance, or—should it fulfil the deviation criteria—based on, derived from and/or set to a predeterminable value, which e.g. may be applicable for a sample with unrealistically high projection distance. Furthermore, since there is determined by combining the deviation parameters of respective polyline path's polyline segments, a respective path deviation for each polyline path, there is established for each polyline path—e.g. representing map lane paths—a respective combined path deviation, which is computed from all deviation parameters along respective polyline path's polyline segment(s). Accordingly, in the resulting path deviation for a polyline path, all deviation parameters assigned to that polyline path's polyline segments—including the predeterminable deviation parameters a.k.a. penalty values assigned to those polyline segments—are taken into account. Thus, in considering to what extent and/or degree identified road reference features align with transformed map road references— subsequently polyline segments of polyline paths—all deviation parameters along respective polyline path matter, even the ones considered to be outliers, i.e. fulfilling deviation criteria and thus being assigned so called penalty values. Taking also outliers into account in the computation of the path deviation and not merely the inliers—i.e. samples with e.g. relatively good and/or at least relatively mediocre alignment—provides for a consistent outcome of the computed path deviation. Thus, according to the introduced concept, alignments and/or associations between sensor measurements and digital map elements may be identified in a consistent manner, subsequently enabling finding most promising and/or best match(es) and/or candidate(s) among the digital map elements—such as most promising and/or best match(es) and/or candidate lane segment(s)—for current sensor measurements, which in turn may support accurate and/or improved vehicle localization.

For that reason, an approach is provided for in an improved and/or alternative manner support determining a pose of a vehicle—e.g. an ADS-equipped vehicle—in view of a digital map.

The technical features and corresponding advantages of the above-mentioned method will be discussed in further detail in the following.

BRIEF DESCRIPTION OF THE DRAWINGS

The various aspects of the non-limiting embodiments, including particular features and advantages, will be readily understood from the following detailed description and the accompanying drawings, in which.

DETAILED DESCRIPTION

Figure 1:
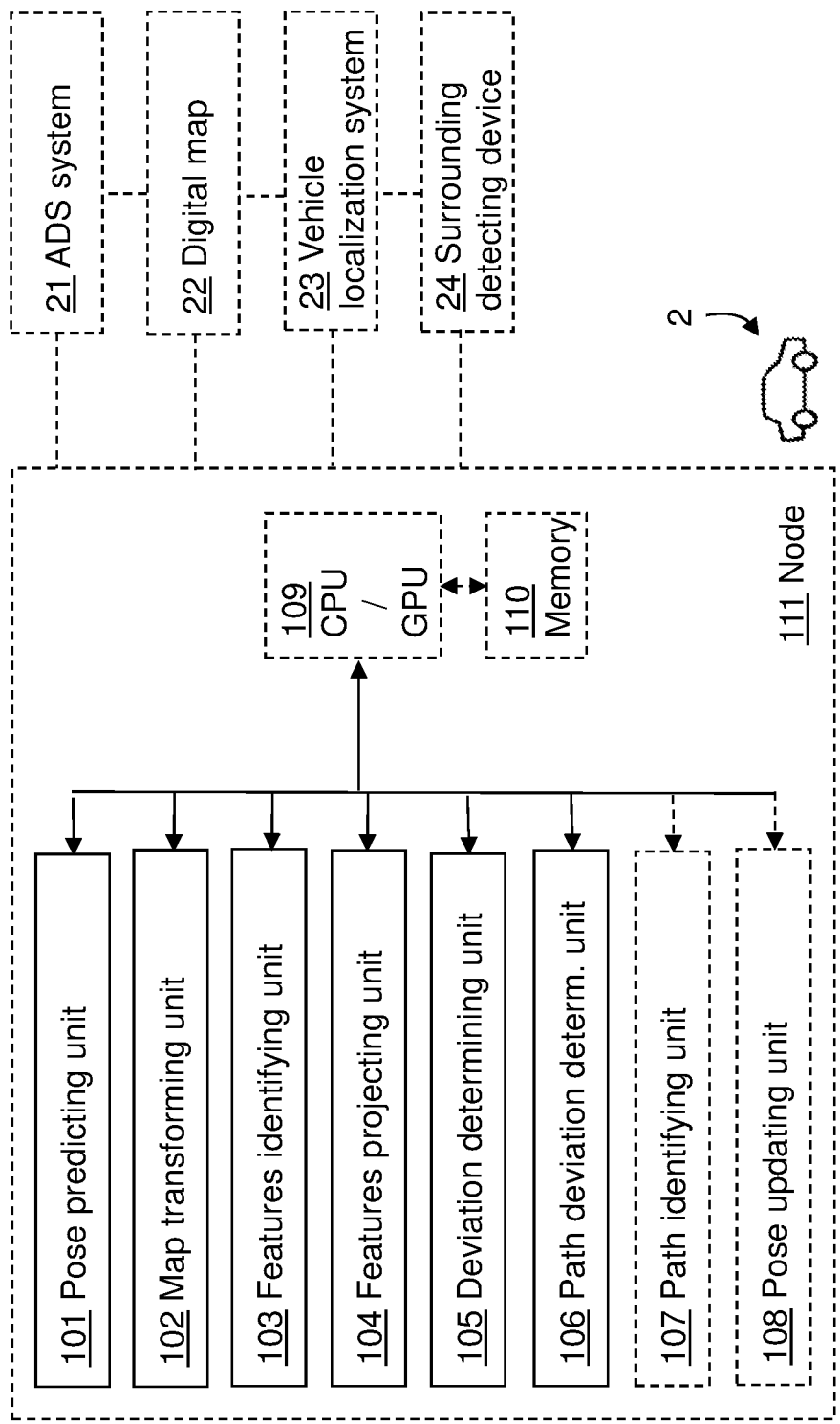
FIG. 1 is a schematic block diagram illustrating an exemplifying vehicle pose assessment system according to embodiments of the disclosure.

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to supporting determining a pose of a vehicle—such as an ADS-equipped vehicle—in view of a digital map, there will be disclosed an approach alleviating finding lane segments of the digital map corresponding to current sensor detections, which in turn may support accurate and/or improved vehicle localization.

Referring now to the figures, there is depicted in FIG. 1 a schematic block diagram illustrating an exemplifying vehicle pose assessment system 1 according to embodiments of the disclosure. The vehicle pose assessment system 1 is adapted and/or configured for supporting determining a pose of a vehicle 2—such as a vehicle equipped with an ADS 21—in view of a digital map 22. Furthermore, the vehicle pose assessment system 1 is—e.g. by means of a pose predicting unit 101—adapted and/or configured for predicting a pose of the vehicle 2 based on sensor data acquired by a vehicle localization system 23. Thereby, from assessing obtained sensory information, there is estimated a position and orientation of the vehicle 2 in the digital map 22

The digital map 22 may be represented by any feasible—e.g. known—one or more digital maps, such as a high definition (HD) map and/or an equivalent and/or successor thereof. Moreover, the vehicle pose may be predicted in any feasible—e.g. known—manner, derived from sensory information obtained with support from a vehicle localization system 23. The vehicle localization system 23 may accordingly be represented by any feasible—e.g. known—localization system adapted and/or configured for monitoring a geographical position and heading of the vehicle 2, e.g. relating to a GNSS such as a GPS and/or a Real Time Kinematics (RTK) GPS for improved accuracy, e.g. supported by the digital map 22. The pose, on the other hand, may for instance be represented by e.g. a 2D Cartesian position and a yaw of the vehicle 2, or a 6D pose where the position is defined by a 3D Cartesian position and the orientation by a roll, pitch and yaw of the vehicle 2. Further details relating to predicting a vehicle pose may for instance be found in the European Patent Application No. EP20217372 by the same applicant incorporated herein by reference, and will for the sake of brevity and conciseness not be further elaborated upon. Furthermore, the phrase "vehicle pose assessment system" may refer to "path and/or polyline association system" and/or "assessment system", whereas "a method performed by a vehicle pose assessment system" may refer to "an at least partly computer-implemented method performed by a vehicle pose assessment system". Moreover, "for supporting determining a pose of a vehicle" may refer to "for enabling and/or alleviating determining a pose of a vehicle", and according to an example further to "for supporting finding digital map lane segments corresponding to sensor detections". The phrase "pose of a vehicle in view of a digital map", on the other hand, may refer to "pose of a vehicle in a digital map", "pose of a vehicle in view of an at least first onboard digital map" and/or merely "pose of a vehicle". Furthermore, the phrase "predicting a pose" may refer to "estimating a pose", whereas "based on sensor data" may refer to "from sensor data" and/or "derived from sensor data". The phrase "acquired by a vehicle localization system", on the other hand, may refer to "obtained and/or gathered by a vehicle localization system", "acquired from and/or with support from a vehicle localization system" and/or "acquired with support from a positioning system and/or onboard sensors", and according to an example further to "acquired by a vehicle localization system potentially with support from a perception system". Moreover, according to an example, "based on sensor data acquired by a vehicle localization system" may refer to merely "based on sensor data".

The vehicle 2 may be represented by any arbitrary—e.g. known—manned or unmanned vehicle, for instance an engine-propelled or electrically-powered vehicle such as a car, truck, lorry, van, bus and/or tractor. The term "vehicle" may refer to "autonomous and/or at least partly autonomous vehicle", "driverless and/or at least partly driverless vehicle", and/or "self-driving and/or at least partly self-driving vehicle", and according to an example further to "production vehicle", "fleet vehicle", "launched vehicle", "road-traffic vehicle" and/or "public road vehicle". Furthermore, the optional ADS 21 on-board the vehicle 2 may be represented by any arbitrary ADAS or AD system e.g. known in the art and/or yet to be developed. Moreover, the vehicle 2 and/or ADS 21 may comprise, be provided with and/or have onboard an optional perception system (not shown) adapted to estimate surroundings of the vehicle 2, and subsequently adapted to estimate world views of the surroundings such as with support from the digital map 22. The perception system may refer to any commonly known system, module and/or functionality, e.g. comprised in one or more electronic control modules, ECUs, and/or nodes of the vehicle 2 and/or the ADS 21, adapted and/or configured to interpret sensory information—relevant for driving of the vehicle 2—to identify e.g. objects, obstacles, vehicle lanes, relevant signage, appropriate navigation paths etc. The perception system—which may be adapted to support e.g. sensor fusion, tracking, localization etc.—may thus be adapted to rely on sensory information. Such exemplifying sensory information may, for instance, be derived from one or more—e.g. commonly known—sensors comprised in and/or provided onboard the vehicle 2 adapted to sense and/or perceive the vehicle's 2 whereabouts and/or surroundings, for instance represented by one or a combination of one or more of surrounding detecting sensors such as image capturing devices e.g. camera(s), RADAR(s), LIDAR(s), and/or ultrasonics etc., and/or—as touched upon above—a vehicle localization system 23 for localizing the vehicle 2 e.g. comprising and/or relating to a positioning system such as a GNSS, odometer, inertial measurement units e.g. configured to detect linear acceleration using one or more accelerometers and/or rotational rate using one or more gyroscopes, etc. In other words, a perception system is in the present context thus to be understood as a system responsible for acquiring raw sensor data from onboard sensors, such as from surrounding detecting sensors etc., and converting this raw data into scene understanding.

Figure 2:
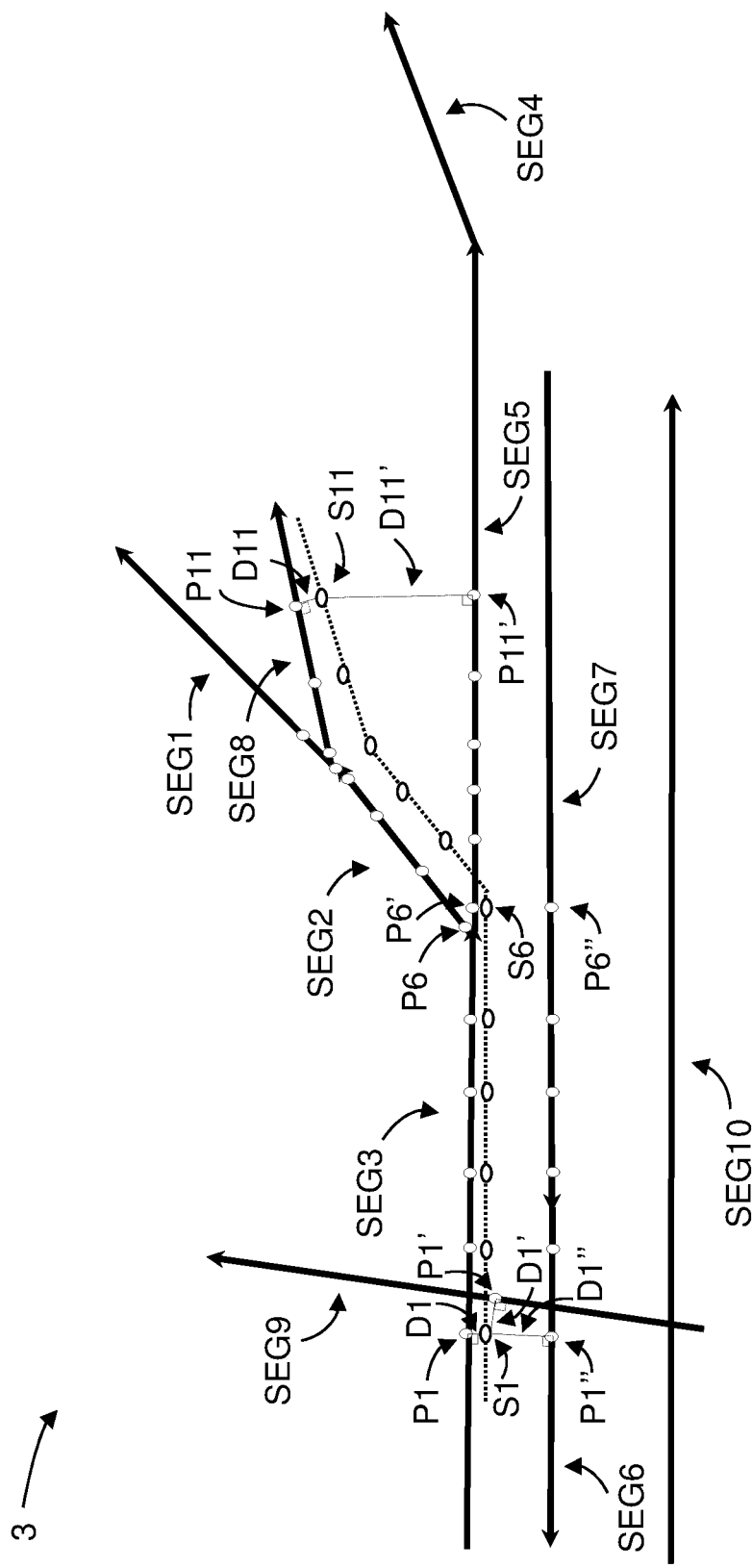
FIG. 2 depicts a schematic view of exemplifying road reference features projected onto exemplifying polylines formed from map road references according to embodiments of the disclosure.

As illustrated in an exemplifying manner in exemplifying FIGS. 1 and 2, the vehicle pose assessment system 1 is further—e.g. by means of a map transforming unit 102—adapted and/or configured for transforming to a selected coordinate system 3 a set of map road references of a portion of the digital map 22 based on the predicted pose of the vehicle 2, wherein the transformed set of map road references form a set of polylines in the selected coordinate system 3, which set of polylines forms a set of polyline paths respectively comprising segments SEG1-SEG10 of polylines. Thereby, there is generated in a preferred coordinate system 3—e.g. as depicted in exemplifying FIG. 2 represented by a 3D ego-frame—polylines respectively comprising series of connected consecutive points representing the transformed map road references—such as e.g. lane markers, road edges and/or road barriers—where polyline segments SEG9-SEG10—e.g. corresponding to lane segments of the digital map—form one or more differing polyline paths, such as lane segment paths. In FIG. 2, polyline paths are exemplified e.g. by respective SEG3+SEG2+SEG1, SEG3+SEG2+SEG8, SEG3+SEG5+SEG4, etc.

The selected coordinate system 3 may be represented by and/or relate to any feasible coordinate system, such as of a surrounding detecting device—for instance an onboard image capturing device—e.g. a camera. The selected coordinate system 3 may accordingly be represented by and/or relate to for instance, as exemplified in FIG. 2, a 3D top-down ego-vehicle-frame, a 3D Cartesian frame—such as with an exemplifying origin in the centre of a rear axis of the vehicle 2—and/or a 2D image-frame, such as with an exemplifying origin at a top-left corner. Moreover, the portion of the digital map 22 of which to transform a set of map road references may be selected in any feasible manner, for instance taking at least the predicted vehicle pose into consideration in selection thereof, e.g. selecting an area and/or region surrounding the vehicle 2 in one or more directions e.g. up to several hundred meters or more. A map road reference, on the other hand, may be represented by any feasible longitudinally repetitive road reference, such as lane markers, road edges, and/or road barriers etc., whose position(s) in the digital map 22 are indicated in the map data. Moreover, the polylines formed from the transformed set of map road references may be of any feasible number, dimensions and/or shapes, and further respectively comprise and/or be formed of any feasible number of map road references. Further exemplifying details relating to transforming map road references to a coordinate system where the transformed map road references form polylines, may for instance be found in the European Patent Application No. EP20217372 by the same applicant incorporated herein by reference, and will for the sake of brevity and conciseness not be further elaborated upon.

The polyline segments SEG1-SEG10 comprising the polylines may be of any feasible number, dimensions and/or shapes, and further for instance correspond to lane segments of the digital map 22, e.g. be limited in one or both ends by road intersections and/or road branches. In FIG. 2, ten exemplifying polyline segments SEG1-SEG10 are depicted in an exemplifying manner, defined to correspond to and/or reflect ten corresponding map lane segments. Moreover, the polyline paths comprising and/or emanating from the polyline segments SEG1-SEG10, for instance corresponding to lane segment paths of the digital map 22, may in a similar manner be of any feasible number, dimensions and/or shapes, and further respectively comprise and/or be formed of any feasible number of concatenated, consecutive and/or connected polyline segments SEG1-SEG8 and/or non-concatenated or isolated polyline segments SEG9-SEG10. In exemplifying FIG. 2, plural exemplifying polyline paths are depicted, such as one formed by polyline segments SEG3, SEG2 and SEG1, another one formed by polyline segments SEG3, SEG2 and SEG8, yet a third one formed by polyline segments SEG3, SEG5 and SEG4, etc.

Furthermore, the phrase "transforming [ . . . ] a set of map road references" may refer to "translating and/or mapping [ . . . ] a set of map road references", "transforming [ . . . ] one or more road references of the digital map", "transforming [ . . . ] a set of road references of the digital map" and/or "transforming [ . . . ] a set of map road references comprising longitudinally repetitive road references". Moreover, "a portion of said digital map" may refer to "a predeterminable portion of said digital map" and/or "an applicable and/or pose-influenced portion of said digital map", whereas "to a selected coordinate system" may refer to "to a preferred and/or predeterminable coordinate system" and/or according to an example further to "from a global coordinate system to a selected coordinate system" and/or "to a selected—e.g. image-frame—coordinate system e.g. of a vehicle mounted image capturing device such as a camera". The phrase "based on the predicted pose of said vehicle", on the other hand, may refer to "in consideration of the predicted pose of said vehicle" and/or "based on map data and the predicted pose of said vehicle". Moreover, the phrase "wherein the transformed set of map road references form a set of polylines" may refer to "wherein the transformed set of map road references is represented by a set of polylines" and/or "wherein from the transformed set of map road references, a set of polylines is generated", whereas "a set of polylines" may refer to "one or more polylines". "Polylines", on the other hand, may refer to "connected consecutive points" and/or "connected series of consecutive points", and according to an example further to "a list of points where lines—or potentially connections of other shape(s)—are drawn between consecutive points" and/or "a connected sequence of lines—or potentially connections of other shape(s)—created as a single object". Moreover, "which set of polylines forms a set of polyline paths" may refer to "which set of polylines reflects and/or represents a set of polyline paths" and/or "which set of polylines forms one or more polyline paths", and according to an example further to "which set of polylines forms a set of map lane segment polyline paths" and/or "which set of polylines forms a set of start-to-end polyline paths". The phrase "respectively comprising segments of polylines", on the other hand, may refer to "respectively comprising concatenated, connected and/or consecutive segments of polylines and/or non-concatenated or isolated segments of polylines", and according to an example further to "respectively comprising segments of polylines corresponding to, limited by and/or defined by lane segments of the digital map associated with the map road references". According to an example, the phrase "the transformed set of map road references form a set of polylines in the selected coordinate system, which set of polylines forms a set of polyline paths respectively comprising segments of polylines" may refer to "the transformed set of map road references form a set of polyline segments in the selected coordinate system, concatenated polyline segments and/or non-concatenated polyline segments forming a set of polyline paths".

As illustrated in an exemplifying manner in exemplifying FIGS. 1 and 2, the vehicle pose assessment system 1 is further—e.g. by means of a feature identifying unit 103—adapted and/or configured for identifying a set of corresponding sensor-captured road reference features S1-S11 acquired by a vehicle-mounted surrounding detecting device 24, each identified road reference feature S1-S11 defining a set of measurement coordinates in the selected coordinate system 3. Thereby, there is found—e.g. in an image—road reference features S1-S11—such as e.g. lane markers, road edges and/or road barriers—corresponding to at least a portion of the set of map road references, obtained with an onboard surrounding detecting device 24 such as e.g. a camera, which sensor-captured road reference features S1-S11 are mapped to the selected coordinate system 3, for instance the coordinate system of said surrounding detecting device 24 or of the ego-vehicle (as e.g. shown in exemplifying FIG. 2).

The set of corresponding sensor-captured road reference features S1-S11 may be identified in any feasible—e.g. known—manner, for instance with support from a perception system, and further be represented by any feasible longitudinally repetitive—e.g. static—road reference features such as lane markers, road edges, and/or road barriers etc. In exemplifying FIG. 2, eleven exemplifying road reference features S1-S11 are depicted, illustrated as connected dots in an exemplifying manner. The surrounding detecting device 24, on the other hand, may be represented by any feasible—e.g. known—at least first surrounding detecting device such as an image capturing device adapted and/or configured for capturing vehicle surroundings, for instance represented by one or more of a camera, LIDAR, RADAR, etc. Furthermore, the phrase "identifying a set of corresponding sensor-captured road reference features" may refer to "determining and/or finding a set of corresponding sensor-captured road reference features", "identifying one or more corresponding sensor-captured road reference features" and/or "identifying a set of sensor-captured road reference features corresponding to and/or matching—and/or to a predeterminable extent corresponding to and/or matching—said set of map road references". Moreover, "sensor-captured road reference features" may refer to "sensor-obtained road reference features" and/or "sensor-obtained longitudinally repetitive road reference objects". The phrase "each identified road reference feature defining a set of measurement coordinates in said selected coordinate system", on the other hand, may refer to "each identified road reference feature being mapped to said selected coordinated system", and according to an example further to "each identified road reference feature defining a set of measurement coordinates in said selected coordinate system, following transformation from a coordinate system—e.g. image-frame coordinate system—of said surrounding detecting device to said selected coordinate system".

As previously touched upon, the portion of the digital map 22 of which to transform a set of map road references may be selected in any feasible manner. Optionally, however, transforming a set of map road references of a portion of the digital map 22 may comprise—and/or the map transforming unit 102 may be adapted and/or configured for—selecting said portion based on the predicted pose of the vehicle 2 and a set of properties of the surrounding detecting device 24, for instance map road references of the digital map 22—and/or digital map portion—associated with altitudes deviating—at least to a predeterminable extent—from an altitude of the vehicle 2 and/or from a field of view of the surrounding detecting device 24, being discarded. Thereby, map road references of the digital map 22, and/or said portion thereof, deemed and/or determined to be irrelevant, non-applicable and/or superfluous—for instance as a result of the digital map 3 comprising multi-level lanes and/or from field of view limitations of the surrounding detecting device 24 and/or from occlusions e.g. by static objects and/or elements—may be ignored and/or refrained from being transformed to the selected coordinate system 3. The altitude of the vehicle 2, the field of view of the surrounding detecting device 24 as well as static objects and/or elements known and/or expected to occlude the surrounding detecting device 24, may be determined and/or have been determined in any feasible—e.g. known—manner.

As illustrated in an exemplifying manner in exemplifying FIGS. 1 and 2, the vehicle pose assessment system 1 is further—e.g. by means of a features projecting unit 104—adapted and/or configured for projecting each of the identified set of road reference features S1-S11 onto the polyline segments SEG1-SEG10 in order to obtain a set of projection points P1-P11, wherein each projection point P1-P11 defines a set of projection coordinates. Thereby, the road reference feature S1-S11 are mapped to respective polyline segment SEG1-SEG10 feasible and/or relevant in view of respective road reference feature S1-S11. Accordingly, a road reference feature S1-S11—such as e.g. S1—may thus obtain multiple projection points P1-P11—such as e.g. P1, P1' and P1"—projected onto differing polyline segments—such as e.g. SEG3, SEG9 and SEG6—respectively. For instance, in exemplifying FIG. 2, road reference feature S1 obtains projection point P1 from being projected onto SEG3, projection point P1' from being projected onto SEG9 as well as projection point P1" from being projected onto SEG6, road reference feature S6 obtains projection point P6 from being projected onto SEG2, projection point P6' from being projected onto SEG5 as well as projection point P6" from being projected onto SEG7, whereas road reference feature S11 obtains projection point P11 from being projected onto SEG8 as well as projection point P11' from being projected onto SEG5.

The set of road reference features S1-S11 may be projected onto—and/or mapped to—the polyline segments SEG1-SEG10 in any feasible manner. According to an example, however, and as illustrated in exemplifying FIG. 2, the set of reference features S1-S11 are projected orthogonally onto the polyline segments SEG1-SEG10, such as, by for each identified road reference feature S1-S11 define a closest index of each polyline segment SEG1-SEG10 relative the road reference feature S1-S11 as the projection point P1-P11 for that road reference feature S1-S11. Further exemplifying details relating to projecting road reference features onto polylines in order to obtain projection points, may be found in the previously mentioned European Patent Application No. EP20217372 by the same applicant incorporated herein by reference, and will for the sake of brevity and conciseness not be further elaborated upon. In said Application, also orthogonal projections landing on an extension of a polyline is described in detail, and will similarly for the sake of brevity and conciseness not be further elaborated upon. Furthermore, the phrase "projecting each of the identified set of road reference features onto the polyline segments" may refer to "projecting each road reference feature of the identified set of road reference features onto each polyline segment deemed relevant and/or feasible for projection of that road reference feature", "projecting said set of road reference features onto the polyline segments" and/or "mapping and/or comparing each of the identified set of road reference features to the polyline segments", and according to an example further to "projecting orthogonally each of the identified set of road reference features onto the polyline segments". Moreover, "in order to obtain a set of projection points" may refer to "to define a set of projection points". According to an example, the phrase "wherein each projection point defines a set of projection coordinates" may refer to "wherein each projection point defines a set of projection coordinates, by for each identified road reference feature define a closest index of each polyline segment relative the road reference feature as the projection point for that road reference feature".

Figure 3:
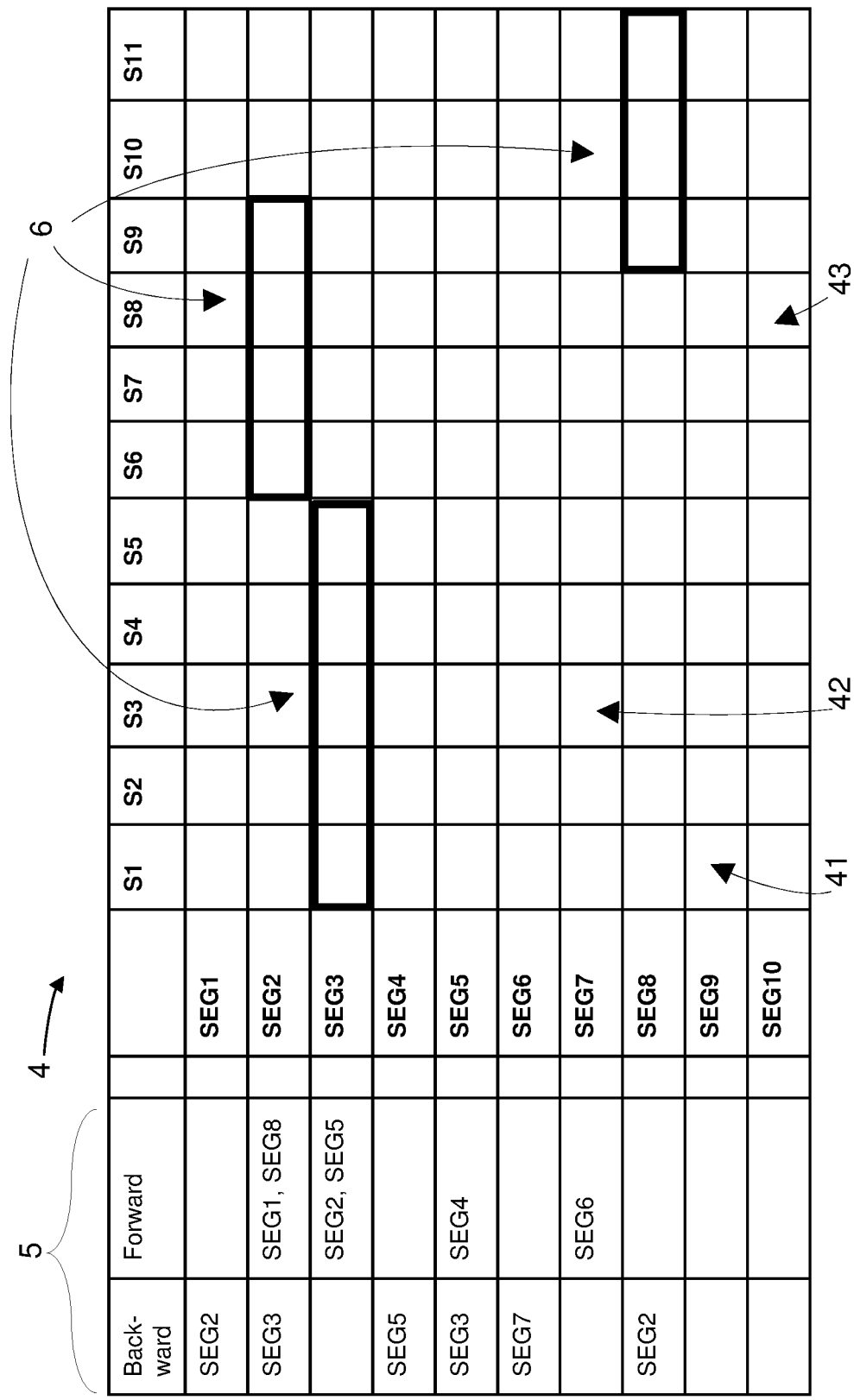
FIG. 3 depicts a schematic view of an exemplifying table of an exemplifying vehicle pose assessment system according to embodiments of the disclosure.

As illustrated in an exemplifying manner in exemplifying FIGS. 1-2, and furthermore in exemplifying FIG. 3, the vehicle pose assessment system 1 is further—e.g. by means of a deviation determining unit 105—adapted and/or configured for determining for each polyline segment SEG1-SEG10, deviation parameters in view of each identified road reference feature S1-S11, based on a projection distance D1-D11 between respective road reference feature's S1-S11 measurement coordinates and its corresponding polyline segment projection coordinates, wherein for each polyline segment SEG1-SEG10 onto which one or more road reference features S1-S11 are having deviations fulfilling deviation criteria, the polyline segment SEG1-SEG10 is assigned predeterminable deviation parameters in view of those one or more road reference features S1-S11. Thereby, there is quantified to what extent and/or how well each road reference feature S1-S11 aligns with respective polyline segment SEG1-SEG10, and further, road reference features S1-S11 e.g. having projection distances D1-D11 greater than a predeterminable threshold—and/or e.g. fulfilling outlier criteria—in view of some polyline segments SEG1-SEG10, render those polyline segments SEG1-SEG10 to be attributed with respective predefined parameters—which may be considered and/or referred to as penalty values and/or penalty terms—pertinent those road reference features S1-S11. Accordingly, each deviation parameter—for each road reference feature S1-S11 in view of each polyline segment SEG1-SEG10—is either based on, derived from and/or set to its corresponding projection distance D1-D11, or—should it fulfil the deviation criteria—based on, derived from and/or set to a predeterminable value, which e.g. may be applicable for a sample with unrealistically high projection distance, commonly referred to as an outlier.

The deviation parameters may—as depicted in an exemplifying manner in FIG. 3—for instance be stored in a table 4. In the exemplifying table 4 of FIG. 3, respective deviation parameter for each road reference feature S1-S11 in view of each polyline segment SEG1-SEG10, is represented by a respective field of the table (from the fifth to fifteenth column in the second to eleventh row). Here, in an exemplifying manner, striped fields 41 reflect relatively small and/or insignificant projection distances D1-D11—subsequently relatively good alignment—between the road reference feature S1-S11 and the corresponding polyline segment SEG1-SEG10 such as D1 for SEG3/S1 and/or D1' for SEG9/S1, dotted fields 42 reflect relatively more significant projection distances D1-D11—subsequently relatively mediocre alignment—between the road reference feature S1—S11 and the corresponding polyline segment SEG1-SEG10 such as D1" for SEG6/S1, whereas empty fields 43 reflect the predeterminable deviation parameter(s)—i.e. the so called penalty value(s)—such as for S1/SEG1, representing relatively poor alignment and/or an outlier. The two left-most columns of the table 4 reflect in an exemplifying manner a connectivity 5 between the different polyline segments SEG1-SEG10, for instance as shown in the third row that SEG2 follows upon SEG3 and that SEG1 and SEG8 follow upon SEG2, or as shown in the sixth row, that SEG5 follow upon SEG3 and that SEG4 follow upon SEG5.

The deviation criteria may be represented by any feasible condition(s) and/or threshold(s) stipulating under what circumstance(s) a polyline segment SEG1-SEG10 should be assigned a predeterminable deviation parameter—e.g. a so called penalty value—pertinent a road reference feature S1-S11. The deviation criteria may thus for instance be represented by a projection distance threshold or any other feasible one or more conditions, which for instance may pinpoint samples with e.g. unrealistically high projection distances and/or non-projectable samples. Moreover, the predeterminable deviation parameter may be the same or differ for differing road reference features S1-S11/polyline segments SEG1-SEG10. Furthermore, the phrase "determining for each polyline segment" may refer to "calculating and/or deriving for each polyline segment", whereas "deviation parameters" may refer to "respective deviation parameters", "deviation values", "association and/or similarity scores", "alignment extent" and/or "error parameters". Moreover, "deviation parameters in view of each identified road reference feature" may refer to "deviation parameters pertinent respective identified road reference feature", whereas "based on a projection distance" may refer to "derived from and/or represented by a projection distance" and according to an example further to "based on a weighted and/or uncertainty-weighted projection distance". Further, "for each polyline segment onto which one or more road reference features are having deviations fulfilling deviation criteria", may refer to "for each polyline segment in view of which—and/or pertinent—one or more road reference features are having deviations fulfilling deviation criteria". The phrase "having deviations fulfilling deviation criteria", on the other hand, may refer to "having deviations fulfilling outlier criteria", and according to an example further to "having projection distances greater than a predeterminable threshold". Moreover, "the polyline segment is assigned predeterminable deviation parameters" may refer to "that polyline segment is assigned predeterminable deviation parameters", "the polyline segment is attributed predeterminable deviation parameters", "the polyline segment is assigned predetermined and/or default deviation parameters" and/or "the polyline segment is assigned predeterminable deviation values, association scores, similarity scores and/or error parameters". The phrase "in view of those one or more road reference features", on the other hand, may refer to "pertinent those one or more road reference features".

Determining the deviation parameters may be accomplished in any feasible manner. Optionally, however, determining deviation parameters may comprise—and/or the deviation determining unit 105 may be adapted and/or configured for—respective deviation parameter being weighted with a respective projection distance uncertainty. Additionally or alternatively, optionally, determining deviation parameters may comprise—and/or the deviation determining unit 105 may be adapted and/or configured for—respective projection distance D1-D11 being weighted based on uncertainties in the predicted pose of the vehicle 2 and/or the road reference feature. Thereby, uncertainties emanating from and/or depending on model(s) utilized and/or propagating into measurements, may be taken into consideration in determining the deviation parameters. Determining the deviation parameters may thus for instance be carried out with support from a Normalized Innovation Squared (NIS) function, which may weight the square of the projection distance D1-D11 based on uncertainties of the vehicle pose and the measurement(s). A predeterminable parameter—i.e. the so called penalty value—is then given to samples which e.g. could not be projected orthogonally and/or whose projection distance is unrealistically high. The NIS value may for instance be normalized using the inverse of the innovation covariance matrix, and based on the property of this matrix—e.g. square, symmetric and/or positive semi-definite—various decomposition algorithms can be used to e.g. speed up the computation—and/or subsequent computations described further on—such as e.g. QR, LU (lower-up), Cholesky, etc. Furthermore, the phrase "respective deviation parameter being weighted with a respective projection distance uncertainty" may refer to "respective deviation parameter and/or projection distance being weighted with a respective projection distance uncertainty", "respective deviation parameter being weighted with a respective projection distance uncertainty of the corresponding road reference feature" and/or "taking into consideration projection distance and/or system uncertainties". Moreover, the phrase "respective projection distance being weighted based on uncertainties in the predicted pose of said vehicle and/or the road reference feature" may refer to "respective projection distance being weighted based on uncertainties in the predicted pose of said vehicle and/or the road reference feature measurement", and according to an example further to "a square of respective projection distance being weighted based on uncertainties in the predicted pose of said vehicle and/or the road reference feature".

As illustrated in an exemplifying manner in exemplifying FIGS. 1-3, the vehicle pose assessment system 1 is further—e.g. by means of a path deviation determining unit 106—adapted and/or configured for determining by combining the deviation parameters of respective polyline path's polyline segments SEG1-SEG10, a respective path deviation for each polyline path. Thereby, for each polyline path—e.g. representing map lane paths—there is established a respective combined path deviation, which is computed from all deviation parameters along respective polyline path's polyline segment(s) SEG1-SEG10. Accordingly, in the resulting path deviation for a polyline path, all deviation parameters assigned to that path's polyline segments SEG1-SEG10—including the predeterminable deviation parameters a.k.a. penalty values assigned to those polyline segments SEG1—SEG10—are taken into account. Thus, in considering to what extent and/or degree identified road reference features S1-S11 align with transformed map road references—subsequently polyline segments SEG1-SEG10 of polyline paths—all deviation parameters along respective polyline path matter, even the ones considered to be outliers, i.e. fulfilling deviation criteria and thus being assigned so called penalty values. Taking also outliers into account in the computation of the path deviation and not merely the inliers—i.e. samples with e.g. relatively good and/or at least relatively mediocre alignment—provides for a consistent outcome of the computed path deviation. Thus, according to the introduced concept, alignments and/or associations between sensor measurements and digital map elements may be identified in a consistent manner, subsequently enabling finding most promising and/or best match(es) and/or candidate(s) among the digital map elements—such as most promising and/or best match(es) and/or candidate lane segment(s)—for current sensor measurements, which in turn may support accurate and/or improved vehicle localization.

The path deviations may be computed in any feasible manner, by for each polyline path combining and/or take into account every deviation parameter of that polyline path's polyline segment(s) SEG1-SEG10. For instance, a brute force approach and/or a topological approach may be utilized. As previously discussed, various decomposition algorithms can be used to e.g. speed up computation(s), such as e.g. QR, LU, Cholesky, etc. Furthermore, the phrase "determining by combining" may refer to "computing by combining" and/or "determining by taking into consideration", whereas "combining the deviation parameters" may refer to "combining all—or essentially all—deviation parameters". Moreover, "deviation parameters of respective polyline path's polyline segments" may refer to "deviation parameters along respective polyline path's polyline segments", whereas "path deviation" may refer to "combined and/or quantified path deviation", "path alignment and/or association score", "path error", "path deviation indication" and/or "path-dependent deviation"

Optionally, and as illustrated in an exemplifying manner in exemplifying FIGS. 1-3, the vehicle pose assessment system 1 may further—e.g. by means of an optional path identifying unit 107—be adapted and/or configured for identifying the polyline path with the least path deviation 6. Thereby, the most promising and/or best alignment and/or association between sensor measurements and digital map elements may be found, pinpointed and/or filtered out—subsequently enabling the lane segment(s) deemed to be the most relevant and/or the best candidate(s) for the current sensor detection(s) to be identified—which in turn may support accurate and/or improved vehicle localization. Identifying the polyline path with the least path deviation 6 may be accomplished in any feasible manner, for instance utilizing a brute force approach and/or a topological approach. As previously discussed, various decomposition algorithms can be used to e.g. speed up computation(s), such as e.g. QR, LU, Cholesky, etc. Moreover, the phrase "identifying the polyline path with the least path deviation" may refer to "identifying by assessment of the respective path deviations, the polyline path with the least path deviation" and/or "identifying the polyline path having a path deviation with smallest cost". Further, in exemplifying FIG. 4, the polyline path identified to have the least and/or lowest path deviation 6, may for instance be represented by SEG3+SEG2+SEG8. According to an example, should a road reference feature S1-S11 have a comparably similar—e.g. relatively good—association with more than one segment SEG1-SEG10—such as e.g. S9 in view of SEG2 and SEG8—then the segment having the comparably best association may be a selected choice in view of that road reference feature S9.

Further optionally, and as illustrated in an exemplifying manner in exemplifying FIGS. 1-3, the vehicle pose assessment system 1 may further—e.g. by means of an optional pose updating unit 108—be adapted and/or configured for updating the predicted pose of the vehicle 2 based on the determined deviation parameters of the identified polyline path.

Thereby, the polyline path identified to have the least path deviation 6, is utilized, contributes and/or used as input in updating the vehicle pose, such as in a measurement update stage for vehicle localization. Further exemplifying details relating to updating a predicted vehicle pose, may for instance be found in the previously mentioned European Patent Application No. EP20217372 by the same applicant incorporated herein by reference, and will for the sake of brevity and conciseness not be further elaborated upon Moreover, the phrase "based on the determined deviation parameters of the identified polyline path" may refer to "based on, taking into account and/or using as input the determined deviation parameters of the identified polyline path" and/or "based on, taking into account and/or using as input the identified polyline path".

As further shown in FIG. 1, the vehicle pose assessment system 1 comprises a pose predicting unit 101, a map transforming unit 102, a features identifying unit 103, a features projecting unit 104, a deviation determining unit 105, a path deviation determining unit 106, an optional path identifying unit 107 and an optional pose updating unit 108, all of which already have been described in greater detail above. Furthermore, the embodiments herein for supporting determining a pose of a vehicle 2 in view of a digital map 22, may be implemented through one or more processors, such as a processor 109, for instance represented by at least a first Central Processing Unit, CPU, at least a first Graphics Processing Unit, GPU, at least a first Tensor Processing Unit, TPU, and/or at least a first Field-Programmable Gate Array, FPGA, together with computer program code for performing the functions and actions of the embodiments herein. Said program code may also be provided as a computer program product, for instance in the form of a data carrier carrying computer program code for performing the embodiments herein when being loaded into the buffer resources prioritizing system 1. One such carrier may be in the form of a CD/DVD ROM disc and/or a hard drive, it is however feasible with other data carriers. The computer program code may furthermore be provided as pure program code on a server and downloaded to the vehicle pose assessment system 1. The vehicle pose assessment system 1 may further comprise a memory 110 comprising one or more memory units. The memory 110 optionally includes high-speed random access memory, such as DRAM, SRAM, DDR RAM, or other random access solid-state memory devices, and further optionally includes non-volatile memory, such as one or more magnetic disk storage devices, optical disk storage devices, flash memory devices, or other non-volatile solid-state storage devices. Moreover, the memory 110 may be arranged to be used to store e.g. information, and further to store data, configurations, scheduling, and applications, to perform the methods herein when being executed in the vehicle pose assessment system 1. For instance, the computer program code may be implemented in the firmware, stored in FLASH memory 110, of an embedded processor 109, and/or downloaded wirelessly e.g. from an off-board server. Furthermore, units 101-108, the optional processor 109 and/or the optional memory 110, may at least partly be comprised in one or more nodes 111 e.g. ECUs of the vehicle 2, e.g. in and/or in association with an ADS 21. It should further be understood that parts of the described solution may be implemented in a system located external the vehicle 2, or in a combination of internal and external the vehicle 2, for instance in one or more servers in communication with the vehicle 2, e.g. in a so called cloud solution. Those skilled in the art will also appreciate that said units 101-108 described above as well as any other unit, interface, system, controller, module, device, element, feature, or the like described herein may refer to, comprise, include, and/or be implemented in or by a combination of analog and digital circuits, and/or one or more processors configured with software and/or firmware, e.g. stored in a memory such as the memory 110, that when executed by the one or more processors such as the processor 109 perform as described herein. One or more of these processors, as well as the other digital hardware, may be included in a single Application-Specific Integrated Circuitry, ASIC, or several processors and various digital hardware may be distributed among several separate components, whether individually packaged or assembled into a System-on-a-Chip, SoC.

Figure 4:
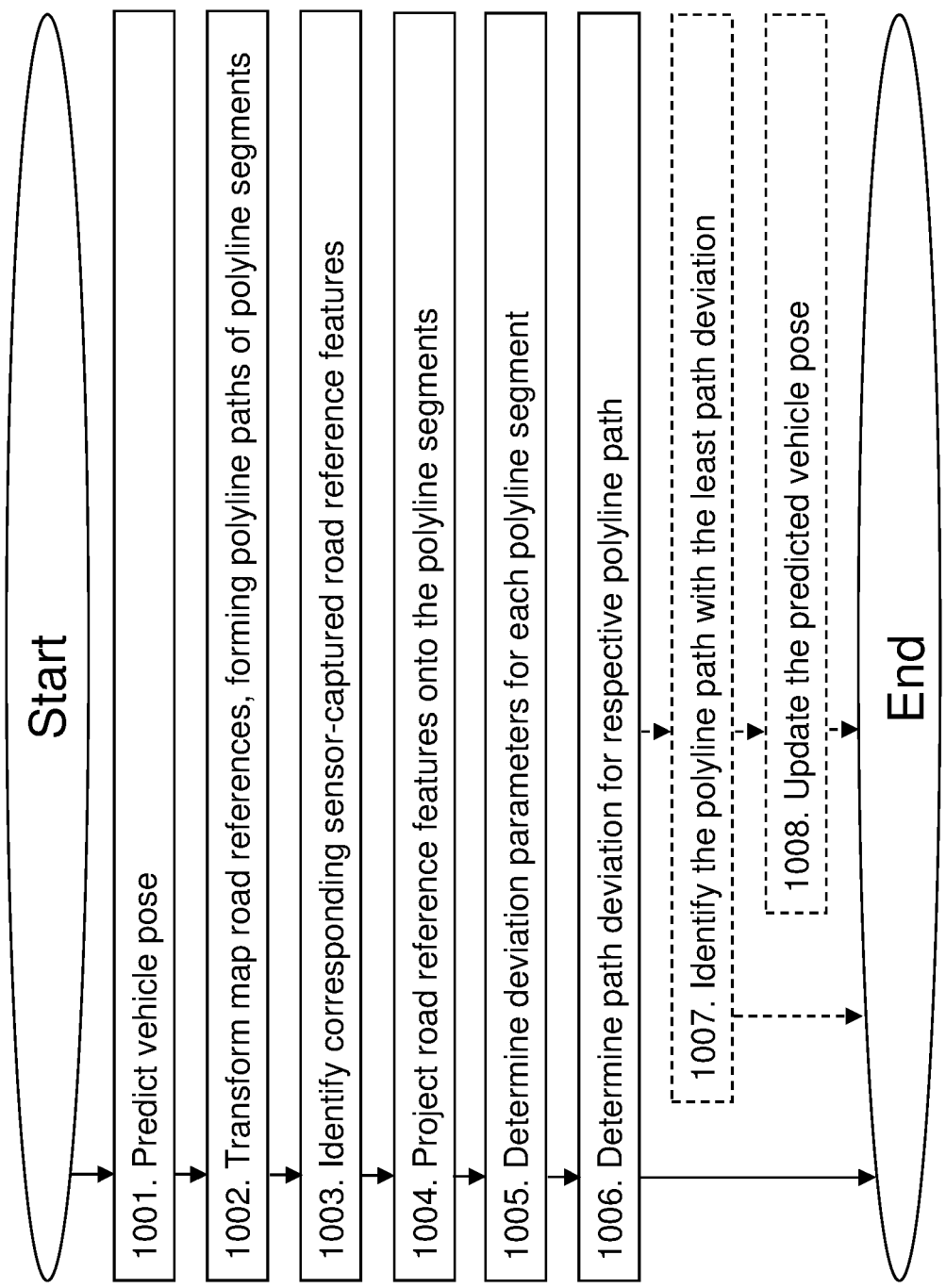
FIG. 4 is a flowchart depicting an exemplifying method performed by a vehicle pose assessment system according to embodiments of the disclosure.

FIG. 4 is a flowchart depicting an exemplifying method performed by a vehicle pose assessment system 1 according to embodiments of the disclosure. Said method is for supporting determining a pose of a vehicle 2 in view of a digital map 22. The exemplifying method, which may be continuously repeated, comprises one or more of the following actions discussed with support from FIGS. 1-3. Moreover, the actions may be taken in any suitable order and/or one or more actions may be performed simultaneously and/or in alternate order where applicable.

Action 1001

In Action 1001, the vehicle pose assessment system 1 predicts—e.g. with support from the pose predicting unit 101—a pose of the vehicle 2 based on sensor data acquired by a vehicle localization system 23.

Action 1002

In Action 1002, the vehicle pose assessment system 1 transforms—e.g. with support from the map transforming unit 102—to a selected coordinate system 3 a set of map road references of a portion of the digital map 22 based on the predicted pose of the vehicle 2, wherein the transformed set of map road references form a set of polylines in the selected coordinate system 3, which set of polylines forms a set of polyline paths respectively comprising segments of polylines SEG1-SEG10.

Optionally, Action 1002 of transforming a set of map road references of a portion of the digital map 22 may comprise—and/or the map transforming unit 102 may be adapted and/or configured for—selecting said portion based on the predicted pose of the vehicle 2 and a set of properties of the surrounding detecting device 24, for instance map road references of the digital map 22—and/or digital map portion—associated with altitudes deviating from an altitude of the vehicle 2 and/or from a field of view of the surrounding detecting device 24, being discarded.

Action 1003

In Action 1003, the vehicle pose assessment system 1 identifies—e.g. with support from the features identifying unit 103—a set of corresponding sensor-captured road reference features S1-S11 acquired by a vehicle-mounted surrounding detecting device 24, each identified road reference feature S1-S11 defining a set of measurement coordinates in the selected coordinate system 3.

Action 1004

In Action 1004, the vehicle pose assessment system 1 projects—e.g. with support from the features projecting unit 104—each of the identified set of road reference features S1-S11 onto the polyline segments SEG1-SEG10 in order to obtain a set of projection points P1-P11, wherein each projection point P1-P11 defines a set of projection coordinates.

Action 1005

In Action 1005, the vehicle pose assessment system 1 determines—e.g. with support from the deviation determining unit 105—for each polyline segment SEG1-SEG10, deviation parameters in view of each identified road reference feature S1-S11, based on a projection distance D1-D11 between respective road reference feature's S1-S11 measurement coordinates and its corresponding polyline segment projection coordinates, wherein for each polyline segment SEG1-SEG10 onto which one or more road reference features S1-S11 are having deviations fulfilling deviation criteria, the polyline segment SEG1-SEG10 is assigned predeterminable deviation parameters in view of those one or more road reference features S1-S11.

Optionally, Action 1005 of determining deviation parameters may comprise—and/or the deviation determining unit 105 may be adapted and/or configured for—respective deviation parameter being weighted with a respective projection distance uncertainty.

Furthermore, optionally, Action 1005 of determining deviation parameters may comprise—and/or the deviation determining unit 105 may be adapted and/or configured for –respective projection distance D1-D11 being weighted based on uncertainties in the predicted pose of the vehicle 2 and/or the road reference feature.

Action 1006

In Action 1006, the vehicle pose assessment system 1 determines—e.g. with support from the path deviation determining unit 106—by combining the deviation parameters of respective polyline path's polyline segments SEG1-SEG10, a respective path deviation for each polyline path.

Action 1007

In optional Action 1007, the vehicle pose assessment system 1 may identify—e.g. with support from the optional path identifying unit 107—the polyline path with the least path deviation.

Action 1008

In optional Action 1008, the vehicle pose assessment system 1 may update—e.g. with support from the optional pose updating unit 108—the predicted pose of the vehicle 2 based on the determined deviation parameters of the identified polyline path.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. A method performed by a vehicle pose assessment system for supporting determining a pose of a vehicle in view of a digital map, the method comprising:
predicting a pose of the vehicle based on sensor data acquired by a vehicle localization system;
transforming to a selected coordinate system a set of map road references of a portion of the digital map based on the predicted pose of the vehicle, the transformed set of map road references forming a set of polylines in the selected coordinate system, which set of polylines forms a set of polyline paths respectively comprising segments of polylines;
identifying a set of corresponding sensor-captured road reference features acquired by a vehicle-mounted surrounding detecting device, each identified road reference feature defining a set of measurement coordinates in the selected coordinate system;
projecting each of the identified set of road reference features onto the polyline segments in order to obtain a set of projection points, each projection point defining a set of projection coordinates;
determining for each polyline segment, deviation parameters in view of each identified road reference feature, based on a projection distance between respective road reference feature's measurement coordinates and its corresponding polyline segment projection coordinates, for each polyline segment onto which one or more road reference features are having deviations fulfilling deviation criteria, the polyline segment is assigned predeterminable deviation parameters in view of those one or more road reference features; and
determining by combining the deviation parameters of respective polyline path's polyline segments, a respective path deviation for each polyline path.

2. The method according to claim 1, further comprising: identifying the polyline path with the least path deviation.

3. The method according to claim 2, further comprising: updating the predicted pose of the vehicle based on the determined deviation parameters of the identified polyline path.

4. The method according to claim 2, wherein determining deviation parameters comprises respective deviation parameter being weighted with a respective projection distance uncertainty.

5. The method according to claim 2, wherein determining deviation parameters comprises respective projection distance being weighted based on uncertainties in the predicted pose of the vehicle and/or the road reference feature.

6. The method according to claim 1, wherein the transforming a set of map road references of a portion of the digital map comprises selecting the portion based on the predicted pose of the vehicle and a set of properties of the surrounding detecting device associated with altitudes deviating from one or both of an altitude of the vehicle and from a field of view of the surrounding detecting device, being discarded.

7. The method according to claim 6, wherein the set of properties of the surrounding detected device comprise one or both of road map references of the digital map and a digital map portion.

8. The method according to claim 1, wherein determining deviation parameters comprises respective deviation parameter being weighted with a respective projection distance uncertainty.

9. The method according to claim 1, wherein determining deviation parameters comprises respective projection distance being weighted based on uncertainties in the predicted pose of the vehicle and/or the road reference feature.

10. A vehicle pose assessment system for supporting determining a pose of a vehicle in view of a digital map, the vehicle pose assessment system comprising:
a pose predicting unit configured to predict a pose of the vehicle based on sensor data acquired by a vehicle localization system;
a map transforming unit configured to transform to a selected coordinate system a set of map road references of a portion of the digital map based on the predicted pose of the vehicle, the transformed set of map road references forming a set of polylines in the selected coordinate system, which set of polylines forms a set of polyline paths respectively comprising segments of polylines;
a features identifying unit configured to identify a set of corresponding sensor-captured road reference features acquired by a vehicle-mounted surrounding detecting device, each identified road reference feature defining a set of measurement coordinates in the selected coordinate system;
a features projecting unit configured to project each of the identified set of road reference features onto the polyline segments in order to obtain a set of projection points, each projection point defining a set of projection coordinates;
a deviation determining unit configured to determine for each polyline segment, deviation parameters in view of each identified road reference feature, based on a projection distance between respective road reference feature's measurement coordinates and its corresponding polyline segment projection coordinates, for each polyline segment onto which one or more road reference features are having deviations fulfilling deviation criteria, the polyline segment is assigned predeterminable deviation parameters in view of those one or more road reference features; and
a path deviation determining configured to determine by combining the deviation parameters of respective polyline path's polyline segments, a respective path deviation for each polyline path.

11. The vehicle pose assessment system according to claim 10, further comprising:
a path identifying unit configured to identify the polyline path with the least path deviation.

12. The vehicle pose assessment system according to claim 11, further comprising:
a pose updating unit configured to update the predicted pose of the vehicle based on the determined deviation parameters of the identified polyline path.

13. The vehicle pose assessment system according to claim 11, wherein the deviation determining unit is configured for a respective deviation parameter being weighted with a respective projection distance uncertainty.

14. The vehicle pose assessment system according to claim 11, wherein the deviation determining unit is configured for a respective projection distance being weighted based on uncertainties in one or both of the predicted pose of the vehicle and the road reference feature.

15. The vehicle pose assessment system according to claim 10, wherein the map transforming unit is configured to select the portion based on the predicted pose of the vehicle and a set of properties of the surrounding detecting device associated with altitudes one of both of deviating from an altitude of the vehicle and from a field of view of the surrounding detecting device, being discarded.

16. The vehicle pose assessment system according to claim 15, wherein the set of properties of the surrounding detected device comprise one or both of road map references of the digital map and a digital map portion.

17. The vehicle pose assessment system according to claim 10, wherein the deviation determining unit is configured for a respective deviation parameter being weighted with a respective projection distance uncertainty.

18. The vehicle pose assessment system according to claim 10, wherein the deviation determining unit is configured for a respective projection distance being weighted based on uncertainties in one or both of the predicted pose of the vehicle and the road reference feature.

19. The vehicle pose assessment system according to claim 10, wherein the vehicle post assessment system is comprised in a vehicle.

20. A non-transitory computer storage medium storing a computer program containing computer program code arranged to cause one of a computer and a processor to perform a method for supporting determining a pose of a vehicle in view of a digital map, the method comprising:
predicting a pose of the vehicle based on sensor data acquired by a vehicle localization system;
transforming to a selected coordinate system a set of map road references of a portion of the digital map based on the predicted pose of the vehicle, the transformed set of map road references forming a set of polylines in the selected coordinate system, which set of polylines forms a set of polyline paths respectively comprising segments of polylines;
identifying a set of corresponding sensor-captured road reference features acquired by a vehicle-mounted surrounding detecting device, each identified road reference feature defining a set of measurement coordinates in the selected coordinate system;
projecting each of the identified set of road reference features onto the polyline segments in order to obtain a set of projection points, each projection point defining a set of projection coordinates;
determining for each polyline segment, deviation parameters in view of each identified road reference feature, based on a projection distance between respective road reference feature's measurement coordinates and its corresponding polyline segment projection coordinates, for each polyline segment onto which one or more road reference features are having deviations fulfilling deviation criteria, the polyline segment is assigned predeterminable deviation parameters in view of those one or more road reference features; and
determining by combining the deviation parameters of respective polyline path's polyline segments, a respective path deviation for each polyline path.

* * * * *